United States Patent [19]

MacDonald et al.

[11] 3,735,948
[45] May 29, 1973

[54] ROCKET CATAPULT

[75] Inventors: Hugh D. MacDonald, Cinnaminson; Norman J. Waecker, Masonville; Charles S. Sterrett, Meadowville, all of N.J.

[73] Assignee: The United States of America as represented by the Secretary of the Army, Washington, D.C.

[22] Filed: June 1, 1971

[21] Appl. No.: 148,562

[52] U.S. Cl. .............................................. 244/122 A
[51] Int. Cl. ........................... B64d 7/00, B64d 11/06
[58] Field of Search .................... 244/122 A, 122 AB, 244/122 AC, 122 AD

[56] References Cited
UNITED STATES PATENTS 3,282,161   11/1966   MacDonald..................244/122 AB

*Primary Examiner*—Richard E. Aegerter
*Attorney*—Harry M. Saragovitz, Edward J. Kelly, Herbert Berl and William Sommer

[57] ABSTRACT

A rocket catapult ejection arrangement for a seat-occupant mass of a disabled aircraft in which the longitudinal axis through the nozzle throat of the rocket motor is always operatively directed toward the center of gravity of the seat-occupant mass regardless of individual seat elevational adjustments affected for any of various flight condition improvements.

12 Claims, 11 Drawing Figures

Patented May 29, 1973

INVENTORS
HUGH D. MacDONALD, JR.
NORMAN J. WAECKER
CHARLES S. STERRETT
BY Harry M. Saragovitz,
Edward J. Kelly, Herbert Berl
& William Sommer ATTORNEYS Patented May 29, 1973

INVENTORS
HUGH D. MacDONALD, JR.
NORMAN J. WAECKER
CHARLES S. STERRETT
ATTORNEYS

Patented May 29, 1973

CHANGE IN NOZZLE
ANGLE FOR SEAT
ADJUSTMENT

INVENTORS
HUGH D. MacDONALD, JR.
NORMAN J. WAECKER
CHARLES S. STERRETT
BY
ATTORNEYS

ROCKET CATAPULT

The invention described herein may be manufactured, used, and licensed by or for the Government for governmental purposes without the payment to us of any royalty thereon.

This invention relates to rocket catapults, and more particularly to an improved rocket catapult ejection system for a seat-occupant of a disabled aircraft.

Successful escape from high speed aircraft at low altitude, where adverse attitude and a high rate of closure to the terrain are primary causes of fatalities, requires exact placement of the thrust from the rocket portion of the rocket assisted catapult in relation to the center of gravity or other designated point of the seat-man system. When the seat actuator is placed between the rocket catapult and the seat itself, adjustment of the seat during various phases of flight causes the thrust line of a nozzle fixed in its angle of output to vary in respect to the center of gravity. This variation creates a moment arm. The moment which is a product of the value of thrust and the moment arm causes the seat-man to become misoriented with the velocity vector, the wind force vector, and the terrain. These factors combined with the parachute system may prevent successful escape. It is important then, for the rocket thrust to be directed as closely as possible to the center of gravity of the seat-man mass or other designated point.

When it is practicable, the actuator is relocated to a position between the airframe and the catapult; the seat is rigidly affixed to the rocket catapult. Therefore, when the seat is adjusted by the actuator the rocket catapult moves with the seat and the thrust line relationship to the center of gravity target is held constant. If a seat has been configured in such a manner as to preclude relocation of the actuator, the thrust misalignment can not be corrected. This has been a distressing problem for a number of years in aircraft such as the F5 and the T38.

It is an object of the invention to provide a rocket catapult ejection arrangement that achieves thrust alignment correction relative to seat position without relocating the actuator.

Another object of the invention is to provide such an arrangement having a precise control of thrust in which the nozzle throat longitudinal axis of the rocket motor is always operationally directed toward a predetermined seat-occupant center of gravity, regardless of adjustments in seat elevation.

These and other objects, features and advantages will become more apparent from the following description and accompanying drawings in which.

Figure 5:
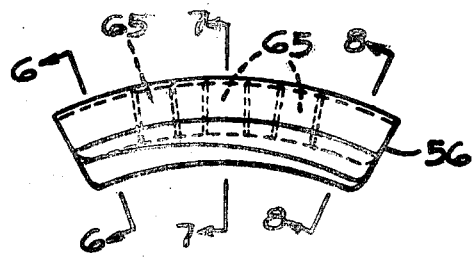
FIG. 5 is a side elevational view of the FIG. 4 clip.
Figure 6:
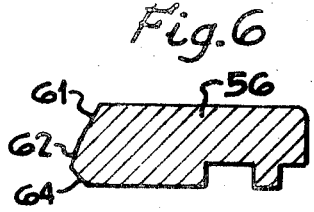
Figure 7:
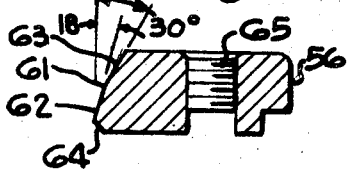
Figure 8:
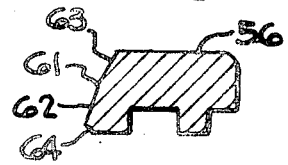

FIGS. 6, 7 and 8 are sectional views taken along lines 6—6, 7—7, and 8—8 of FIG. 5.

Figure 1:
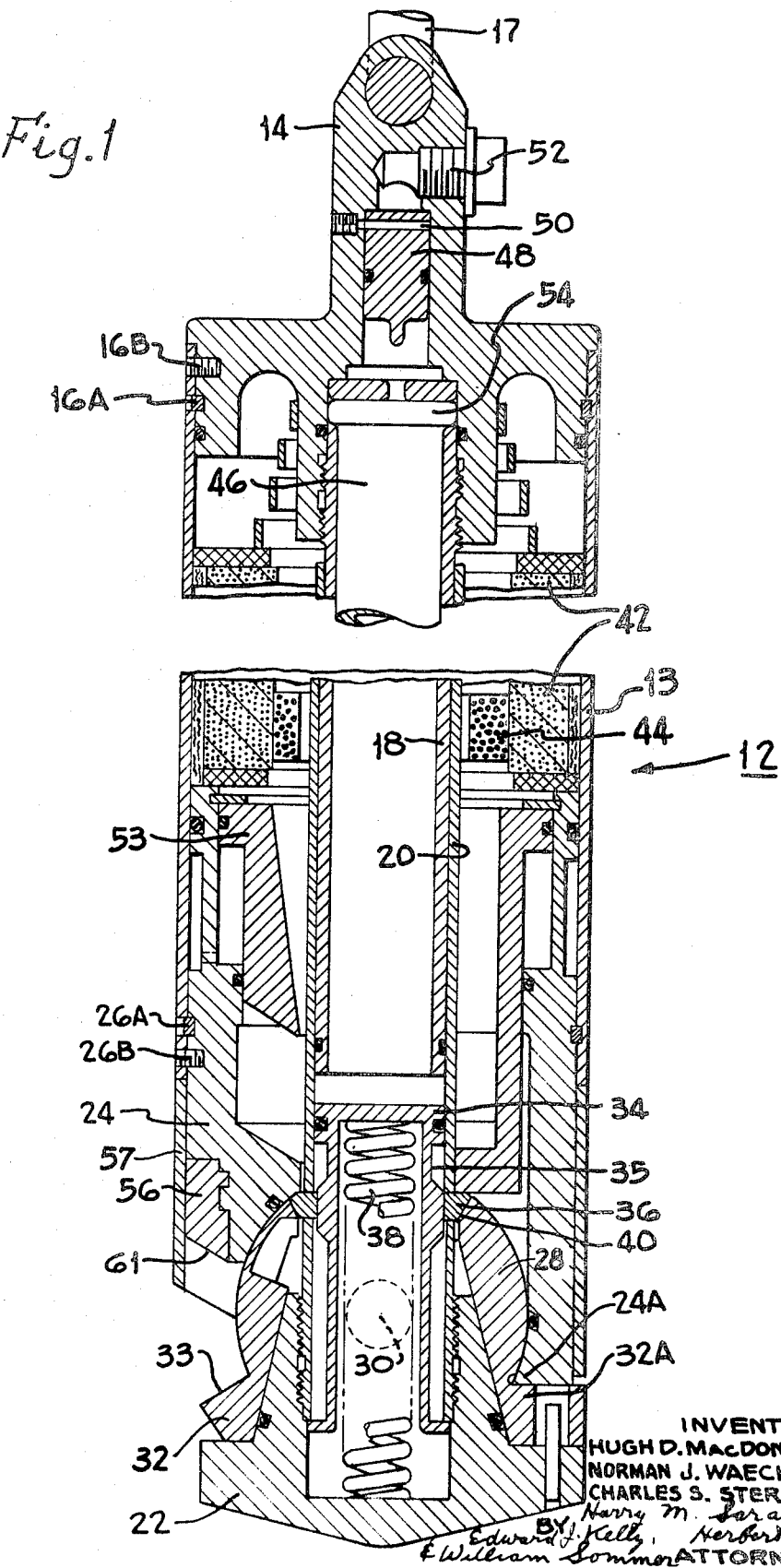
FIG. 1 is a longitudinal sectional view of rocket catapult ejection arrangement with certain parts omitted embodying the principles of the invention.
Figure 9:
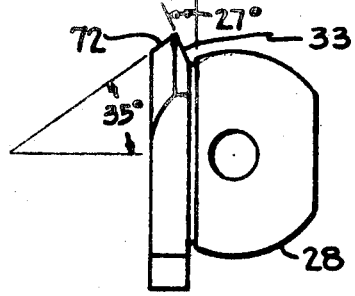

FIG. 9 is a side elevational view of the rotatable nozzle of FIG. 1.

Figure 10:
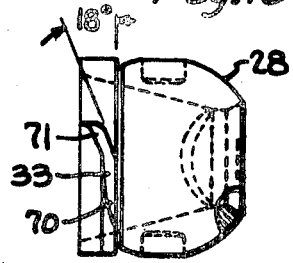

FIG. 10 is a top plan view, partially broken away in section, of the FIG. 9 nozzle.

Figure 3:
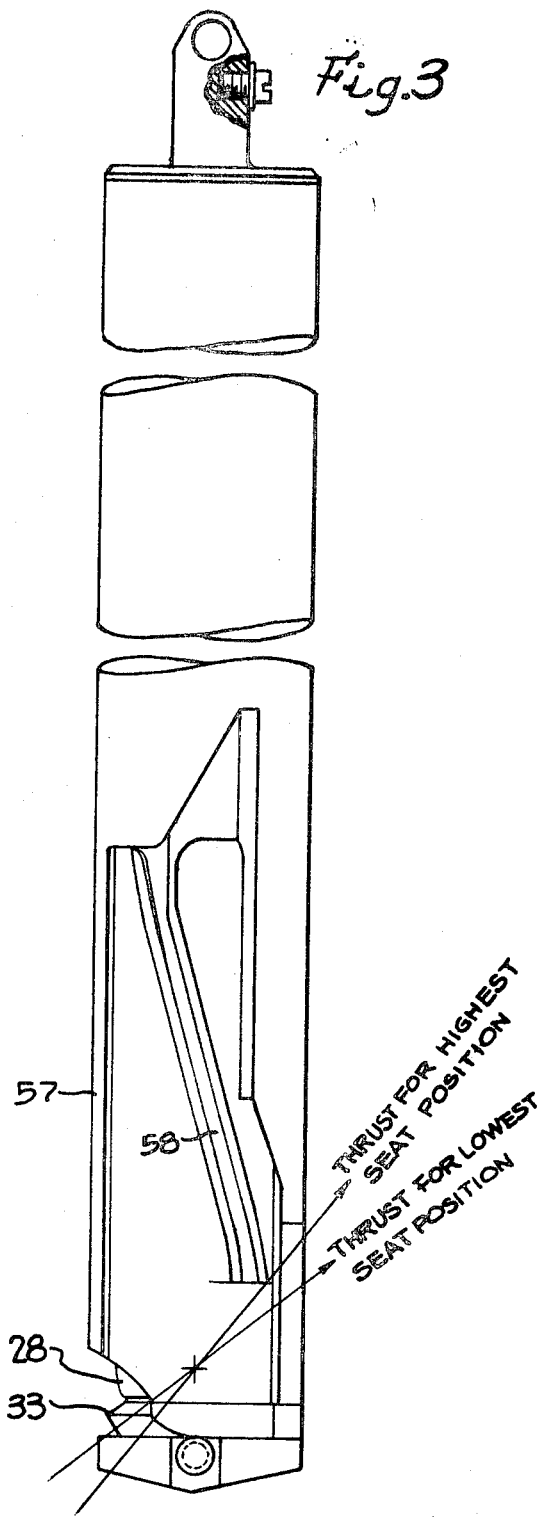
FIG. 3 is a partial side elevational view of the FIG. 2 arrangement with the seat structure and camming lug removed.
Figure 4:
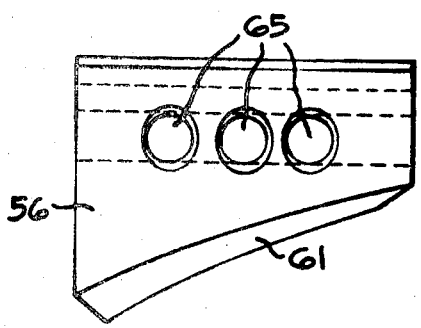
FIG. 4 is an enlarged top plan view of the arcuate segmental clip member of FIGS. 1 and 2.
Figure 11:
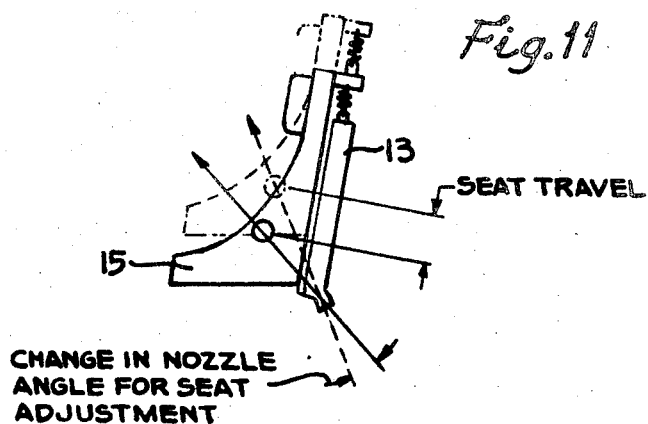

FIG. 11 is a side elevational view of the adjustable seat with its associated rocket catapult ejection arrangement wherein the extreme thrust angles are viewed from the opposite side of the FIG. 3 arrangement.

Referring to the drawings wherein like reference numerals denote the same elements, the rocket catapult ejection arrangement, shown generally at 12, (FIG.1) has a motor tube or main body 13 and a head member 14 which is attached to the ejectable aircraft seat 15 (FIG. 11) via an appropriate actuator attachment 17. The head member 14 is secured to the body 13 with a suitable lock wire 16A and pin 16B arrangement.

A pair of telescoping tubes is contained within the body 13 and is designated as the booster or inner tube 18 and the launch or outer tube 20. The inner tube 18 is fixed to the head member 14, thus forming an integral unit with the main body 13. The outer tube 20 is removable from the main body 13 and extends to a point beyond the lowermost portion of the assembly integrally fixed with the outer tube 20 and forming the lower end thereof is a member 22 for attachment of the assembly 12 to an aircraft. The member 22 is fixed to the outer tube 20 by a thread or by a suitable force fit and locked thereto.

The lower end of the main body 13 consists of a nozzle housing 24 fixidly arranged therewith by means of lock wire 26A and pins 26B or the like. A rocket nozzle 28 is rotatably mounted within the nozzle housing 24 by means of trunnion pins 30. The throat of the nozzle is bored slightly eccentrically to the nozzle block 32 and the throat of the nozzle 28 is longitudinally aligned with the main body 13 during standby condition as shown in FIG. 1.

The outer tube 20 and the main body 13 are locked together by means of a plunger or cam member 34 cooperating with a key 36, both being in operative relationship with the nozzle 28 and nozzle housing attachment 26A and 26B, all in combination coacting to, in essence, lock the catapult-ejector assembly 12 to an aircraft during standby condition. The cam member 34 is longitudinally positioned within the outer tube 20 and is fixed in a desired position by a helical coil spring 38 having one end disposed in a suitable longitudinal recess in the cam member 34 and the other end fixed inside the member 22 such that the spring 38 resists movement of the cam member 34 downwardly towards the member 22. The spring 38, shown extended, is preferably in its free length orientation so as not to urge an upwardly directed force on the cam member 34. The key 36, which passes through an opening in the outer tube 20, is shaped at one end to move smoothly along the contour of the cam member 34 surface, and at its other end, the end without the outer tube 20, to conform to and complement the surface of the upper end 40 of the nozzle 28. The nozzle 28 thus acts to restrain the movement of the key 36 during standby and also acts to insure that the key 36 falls away into a recess 35 provided therefor by the cam member 34 in accordance with its contour. The lower end portion of the nozzle 28 has a part of its block 32 shaped to mate with a complementary part of the lower end of the nozzle housing 24. This is illustrated in FIG. 1 as 32A and 24A. Thus, as is readily seen, the coaction of the spring urged cam member 34, the key 36, the upper end 40 of the nozzle, and the nozzle 28 and nozzle housing 24 serves to lock the catapult-ejector assembly 12 to an aircraft when the member 22 is attached thereto. Cooperation between the nozzle 28 and nozzle housing 24 at 32A and 24A limits the nozzle unidirectional rotation.

A solid propellant 42 is disposed within the body and produces gases for the rocket action during the sustainer phase of propulsion. The propellant 42 is ignited when the auxiliary igniter 44 is fired by the hot gases produced by ignition of the propellant of the cartridge 46. The cartridge 46 is disposed in the upper end portion of the inner tube 18. Means provided for firing the cartridge 46 include a firing pin 48 which is anchored to the head member 14 by a shear pin 50 and is actuated by a gas applied under pressure through an outlet port 52. The firing pin 48 is arranged to strike a primer 54 which in turn will ignite the propellant in the cartridge 46. The cartridge may be fired electrically, mechanically or in any conventional manner. Seal rings are provided at appropriate locations to prevent propellant gas leakage.

In operation of the illustrated embodiment of this invention, the cartridge 46 is fired and gases under pressure are generated. The inner tube 18 extends to a position in close proximity with the cam member 34, thus the cartridge gases act only thereon and urge the cam member 34 downwardly against the force of the spring 38. The key 36 is then displaced into the recess 35 provided between the inner wall of the outer tube 20 and the surface of the cam member 34 as contoured. The main body 13 is free to move upwardly and the booster phase of propulsion (the tube action of the catapult-ejector 12) is commenced. The extent of the tube action is determined by the length of the outer tube 20. Cartridge gases continue to travel down the inner tube 18 and the outer tube 20 and proceed through the nozzle 28 which is precluded from rotating by the outer tube 20 until the booster phase of propulsion (tube action) is completed when lower end of inner tube 18 passes the upper end of the outer tube 20. The cartridge gases are now directed into the main body 13 and fire the auxiliary igniter 44 which in turn fires the propellant 42. At this stage the sustainer propulsion phase or rocket action has commenced.

The propellant 42 gases act on the eccentrically positioned nozzle throat and camming sleeve 53 to rotate the nozzle throate about trunnions 30.

An adjustable cam stop 56 is positioned angularly on the body of the catapult-ejector so that the final position of the nozzle 28 is determined thereby. The surface of the cam stop 56 is contoured and the mating surface 32A of the nozzle 28 is coordinately contoured to the cam stop 56 so that at any given angular position of the cam stop 56 a positive contact area is assured between the cam stop 56 and the nozzle surface 33 which has predetermined coordinately contoured protruding abutment surfaces.

Figure 2:
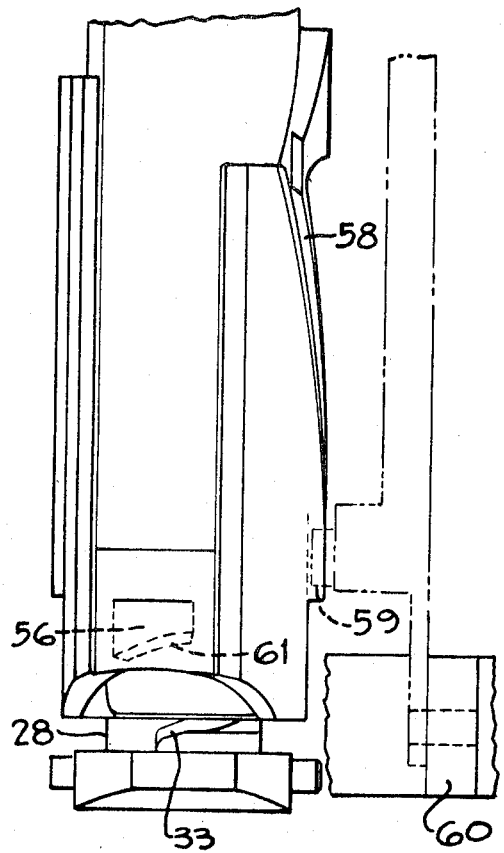
FIG. 2 is a partial rear elevational view of the seat structure and rocket motor showing the cam and track interconnection therebetween.

Rotatably mounted on predetermined groove portions of the nozzle housing 24 is an adjustable stop means which includes an arcuate segmental clip member 56 (FIGS. 1, 2, 4–8) which has a grooved undersurface matingly slidable across the nozzle housing lateral surface, and to which is secured by appropriate screws a cylindrical sleeve portion 57 having a cam follower track 58 (FIGS. 2,3) of predetermined contour for receiving a protruding lug 59 of the seat structure of which 60 is the lower seat bracket. Longitudinal motion of lug or cam 59 consonant with elevational adjustment of seat 15 will impart rotational adjustment of the clip member 56, the cylindrical track sleeve 57 rotating relative to nozzle housing 24 and main body 13. Preferably, the track 58 is of a right hand spiral configuration, having a helix angle of substantially 15°.

The clip member 56 has a rearward stop surface 61 (FIGS. 1, 2, 4, 6–8) of predetermined contour that extends in the path of nozzle abutment surface 33. Stop surface 61 has a lead of substantially 2.9 inches and a helix angle of substantially 70°. It also has a separate pair of face angle portions 62, 63 (FIGS. 6–8) and relieved surface portion 64 having a bevel angle of substantially 45° relative to a plane transverse to the longitudinal axis of the rocket-catapult motor. The clip face angle surface portions 62, 63 extend at respective angles of substantially 18° and 30° relative to the transverse plane, and the outer surface of the clip has a plurality of tapped holes 65. The clip is constructed and arranged that when the seat 15 is elevated the permitted angle of nozzle rotation is reduced. Preferably, for extreme adjusted seat positions 5 inches apart, the designed tiltable nozzle angles (also the directions of rocket thrust through the predetermined occupant-seat mass center of gravity) relative to the rocket motor longitudinal axis are 52° for low seat position and 38° 50' for the highest seat position (FIGS. 3, 11).

The nozzle abutment surface 33 (FIGS. 1–3, 9, 10) has a face angle surface portion 70 (FIG. 10) having an angle of substantially 27° relative to a plane transverse to the throat longitudinal axis of the nozzle. It also has a compound face and helix angle surface portion 71 having respective angles of substantially 27° and 18° relative to the same transverse plane. The nozzle abutment surface 33 is tiltable about trunnions 30 in a plane containing all of the predetermined center of gravity locations of the occupant-seat mass pursuant to elevational adjustments thereof between the aforesaid designed limits. The nozzle surface 72 (FIG. 9) rearwardly adjacent nozzle abutment surface 33 is relieved at approximately an angle of 35° relative to the nozzle throat longitudinal axis so that the rotating nozzle can clear the track sleeve 57 overlying clip 56.

The angular position of the sleeve track 58 is determined by the lug 59 attached to a bar which is fixedly mounted to the seat bucket or other suitable structure. When the seat is moved upward or downward because of the operation of the electric actuator which is under the control of the aircraft pilot, the force developed between the lug follower 59 and the cam track 58 causes the track to change its angular position. The stop 56 being fixedly attached to the track sleeve 57 changes its angular position. This angular position is the correct position for the proper thrustline center of gravity relationship which is determined by the calculated contours of the nozzle surface 33, the stop 56 and the track 58 so that when the catapult ejector is actuated and the rocket phase begins in its proper sequence the nozzle will swing to the stop 56 and direct the thrust generated by the rocket nozzle 28 through the center of gravity or other designated point of the seat-man mass.

It should be noted that the pilot will adjust his seat position numerous times during his flight to extreme positions of the possible seat adjustment in order to adequately perform his functions during various phases of his flight mission. Normally the seat will be adjusted upwardly for take off and landing and downwardly for use of gun sight or other equipment. The physical characteristics (height and weight) and the pilot's personal preference are important factors that determine his positions within the context of his operational requirements. Through the use of this invention the rocket will automatically and correctly maintain the correct angular position of the stop 56 in the standby condition of the catapult-ejector so that when actuated in an emergency egress the nozzle 28 will direct its thrust to the center of gravity or other designated point of the seatman mass and provide seat stability for correct and best operation of the escape system which will allow the other equipment such as the parachute to provide a safe escape of the pilot.

Various modifications, changes or alterations may be resorted to without departing from the scope of the invention as set forth in the appended claims.

We claim:

1. In a rocket catapult ejection system for a seat-occupant mass of an aircraft having rocket motor means attached at one end to an aircraft seat structure, and carrying a unidirectionally tiltable nozzle member at the other end, said seat-occupant mass having a predetermined center of gravity for elevationally adjusted positions of said aircraft seat structure, said nozzle being tiltable in a plane containing all of said center of gravity locations, said rocket motor means having a rearwardly located nozzle housing having transversely extending trunnion means rotatably supporting said nozzle member, said nozzle member having a coordinately contoured protruding abutment surface, adjustable stop means rotatably mounted on said nozzle housing and having a stop surface of predetermined contour extending in the path of said nozzle abutment surface, said stop means including a cylindrical sleeve portion having a cam follower track of predetermined angular contour for receiving a protruding lug of said seat structure, so constructed and arranged that longitudinal movement of said lug in elevational adjustment of said seat will rotate said track sleeve and impart rotational adjustment of said stop surface.

2. The structure in accordance with claim 1 wherein said track is of spiral configuration.

3. The structure of claim 2 wherein the track is a right hand spiral having a helix angle of substantially 15°.

4. The structure according to claim 3 wherein said adjustable stop means includes an arcuate segmental clip member having a grooved undersurface in matingly slidable position on a lateral surface of said nozzle housing, and a rearward surface including a separate pair of face angle portions, and a relieved surface portion having a bevel angle of substantially 45° relative to a plane transverse to the longitudinal axis of said rocket motor means.

5. The structure of claim 4 wherein said clip rearward surface has a lead of substantially 2.9 inches and a helix angle of substantially 70°, so constructed and arranged that when said seat is elevated the permitted angle of nozzle rotation is reduced.

6. The structure of claim 5 wherein said clip face angle surface portions extend at respective angles of substantially 18° and 30° relative to said transverse plane, and the outer surface of said clip has a tapped hole for threaded connection of said sleeve portion thereto.

7. The structure of claim 6 wherein said nozzle abutment surface has a face angle surface portion having an angle of substantially 27° relative to a plane transverse to the throat longitudinal axis of said nozzle and a compound face and helix angle surface portion having respective angles of substantially 27° and 18° relative to said transverse plane.

8. The structure of claim 1 wherein said nozzle abutment surface has a face angle surface portion having an angle of substantially 27° relative to a plane transverse to the throat longitudinal axis of said nozzle and a compound face and helix angle surface portion having respective angles of substantially 27° and 18° relative to said transverse plane.

9. The structure according to claim 1 wherein said adjustable stop means include an arcuate segmental clip member having a grooved undersurface in matingly slidable position on a lateral surface of said nozzle housing, and a rearward surface including a separate pair of face angle portions, and a relieved surface portion having a bevel angle of substantially 45° relative to plane transverse to the longitudinal axis of said rocket motor means.

10. The structure of claim 9 wherein said clip rearward surface has a lead of substantially 2.9 inches and a helix angle of substantially 70°, so constructed and arranged that when said seat is elevated the permitted angle of nozzle rotation is reduced.

11. The structure of claim 10 wherein said clip face angle surface portions extend at respective angles of substantially 18° and 30° relative to said transverse plane, and the outer surface of said clip has a tapped hole for threaded connection of said sleeve portion thereto.

12. The structure of claim 11 wherein said nozzle abutment surface has a face angle surface portion having angle of substantially 27° relative to a plane transverse to the throat longitudinal axis of said nozzle and a compound face and helix angle surface portion having respective angles of substantially 27° and 18° relative to said transverse plane.

* * * * *